UNITED STATES PATENT OFFICE.

MATTHEW D. MANN, JR., OF ROSELLE, NEW JERSEY, ASSIGNOR TO STANDARD OIL COMPANY, OF BAYONNE, NEW JERSEY, A CORPORATION OF NEW JERSEY.

PURIFYING ALCOHOLIC LIQUID.

1,413,864.             Specification of Letters Patent.      Patented Apr. 25, 1922.

No Drawing.      Application filed March 15, 1920. Serial No. 365,884.

*To all whom it may concern:*

Be it known that I, MATTHEW D. MANN, Jr., a citizen of the United States, residing at Roselle, in the county of Union and State of New Jersey, have invented a new and useful Improvement in Purifying Alcoholic Liquids, of which the following is a specification.

The present invention relates to the purification of alcohols and aqueous solutions thereof, and more particularly to the separation therefrom of oils, such as hydrocarbons. It will be clearly understood from the following description of an illustrative process in which it is employed.

In the preparation of higher alcohols, that is, of alcohols containing three or more than three carbon atoms, from the olefines contained in oil distillation products, either liquid or gaseous, by first forming the addition products of such olefines with sulfuric acid, and subsequently hydrolyzing the sulfated compound thus formed, the preliminary separation of the alcohols is in general effected by steam distillation of the hydrolyzed compounds or by their distillation in the presence of water. The distillate thus produced generally forms two layers; an oily layer consisting chiefly of alcohols with a small amount of water and an aqueous layer consisting of an aqueous solution of alcohols. The aqueous layer, on separation, is usually found to entrain relatively small quantities of hydrocarbons, the removal of which is highly desirable.

In accordance with the present invention the removal of the hydrocarbons from the aqueous liquid may be effected as follows: It will be assumed that the liquid treated is the aqueous distillate resulting from the treatment as above described of the gaseous products of pressure cracking distillation of petroleum oil, and consisting essentially of a 20-25% aqueous solution of iso-propyl alcohol with traces of higher secondary alcohols, together with the undesirable hydrocarbons which pass over during the distillation of the liquid. This liquid is passed through one or more sawdust beds, each of which may have a depth of about 12-24 inches. The alcoholic liquid is thereby freed from the hydrocarbons, which are selectively absorbed by the sawdust. It is the use of a selectively absorbing material such as sawdust which I regard as a feature of primary importance in my invention.

The completeness of the removal of the hydrocarbons from the liquid may be readily determined by dropping a sample of the treated liquid into clear water. Cloudiness or turbidity indicates incomplete removal of the hydrocarbons. In case of incomplete removal of the hydrocarbons, as so indicated, the rate of flow of the liquid through the sawdust bed or beds may be decreased, the depth or number of the beds may be increased, or the sawdust may be replaced by fresh sawdust, as deemed most advisable by the operator. The relative solubility of the hydrocarbons in the liquid may be decreased, if desired, by the addition to the aqueous liquid of a relatively small amount of a salt, for example, common salt. Thus 10% of common salt may be added to the liquid before the filtration through the sawdust.

It is readily apparent that, if desired, the intimate contact of the sawdust with the alcoholic liquid may be effected in other ways than that hereinbefore described. Thus, the alcoholic liquid may be thoroughly agitated with the sawdust and the mixture passed through a filter press, or other means may be utilized to remove the sawdust containing the absorbed hydrocarbon.

I claim:

1. The process of purifying an alcoholic liquid contaminated with small amounts of oil, which consists in intimately contacting the liquid with sawdust and separating the liquid from the sawdust, whereby said small amounts of oils are removed from the liquids.

2. The process of purifying an aqueous solution of isopropyl alcohol containing small amounts of oils which consists in filtering said solution through sawdust, said small amounts of oil being retained in the sawdust.

3. The process of purifying an aqueous solution of isopropyl alcohol containing small amounts of oils which comprises adding salt to the solution and filtering the solution through sawdust, said small amount of oil being retained in the sawdust.

MATTHEW D. MANN, JR.